United States Patent Office 3,256,301
Patented June 14, 1966

3,256,301
2-ALKYLSULFONYLBENZOFURANS
Marvin L. Oftedahl, Crestwood, Mo., assignor to Monsanto Company, a corporation of Delaware
No Drawing. Filed July 31, 1964, Ser. No. 386,756
14 Claims. (Cl. 260—346.2)

This invention relates to a novel group of organic chemical compounds. More particularly, this invention is concerned with certain 2-alkylsulfonylbenzofurans and substituted derivatives thereof. In addition, this invention is concerned with a new process for the preparation of such compounds. The benzofurans hereinafter described have been found to possess activity in the control of bacterial and fungal organisms.

The novel compounds of this invention are characterized by the formula,

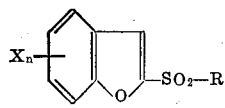

wherein R represents lower alkyl (the term "lower alkyl", as employed herein, designating those alkyl groups having up to six carbon atoms), $n$ is an integer from zero to three, and X is selected from the group consisting of chlorine, bromine, nitro and trifluoromethyl.

It has been found that said novel compounds are produced by reacting salicylaldehyde, or an appropriately substituted derivative thereof, with a bis(lower alkylsulfonyl)methane. The reaction is carried out in the presence of an excess of an organic base. The reactants are heated, preferably in an inert organic solvent, and the water which forms during the reaction is trapped. The reaction time and temperature will be primarily dependent upon the particular reactants and solvent selected and should generally be such that substantially all of said water is removed from the reaction mixture.

The inert organic solvents which are employed in the practice of this invention include aromatics such as benzene, toluene, the isomeric xylenes, the chlorobenzenes and the like, and the alkanes having boiling points of at least about 100° C., such as octane, 2-methylheptane, 3,4-dimethylhexane, 2,2,4-trimethylpentane and the like. The reaction is quite readily carried out at the reflux temperature of the system. In selecting a particular solvent, consideration should be given to the extent to which said solvent will facilitate the removal of the water which forms during the reaction. From this standpoint, the above-mentioned aromatic solvents are especially preferred.

The organic bases which are employed in the practice of this invention can be characterized as secondary and tertiary amines having an ionization constant of at least about $10^{-5}$. Such bases include piperidine ($K=1.6\times10^{-3}$), pyrrolidine ($K=5.37\times10^{-3}$), methylpyrrolidine ($K=1.6\times10^{-4}$), dimethylamine ($K=5.2\times10^{-4}$)

diisopropylamine ($K=1.13\times10^{-3}$), triethylamine ($K=5.65\times10^{-4}$)

triisobutylamine ($K=2.6\times10^{-4}$)

and the like. The bases which are particularly preferred are the tertiary lower alkylamines.

The salicylaldehyde and bis(lower alkylsulfonyl)methane reactants are used in about equimolar quantities in carrying out the process of the invention. The organic base is generally present in a relatively slight molar excess. For example, said base is most often employed in from about 5% to about 50% molar excess relative to the molar amount of either of the said reactants.

The invention will be more fully understood by reference to the following specific examples. Such examples, however, are given solely for purposes of illustration, and are not to be construed as limiting the scope of the present invention in any way.

Example 1

A suitable reaction vessel is charged with 3.1 grams (0.025 mol) of salicylaldehyde, 5.0 grams (0.025 mol) of bis(ethylsulfonyl)methane and 50 ml. of toluene. There is then added 2.8 ml. (0.028 mol) of piperidine, and the reaction mixture is heated at reflux temperature for about 18 hours. The water which forms during this period is collected in a Dean-Stark trap. The solvent is removed at reduced pressure, and the residue is treated with 1.6 ml. of glacial acetic acid. The resulting mixture crystallizes on standing and is recrystallized from isopropanol to yield 2-ethylsulfonylbenzofuran as white prisms, M.P. 91–92° C.

Example 2

Following the procedural details set forth in Example 1, p-xylene is substituted for the toluene, and pyrrolidine is substituted for the piperidine. The product obtained is again 2-ethylsulfonylbenzofuran.

Example 3

Following the procedural details set forth in Example 1, bis(butylsulfonyl)methane is substituted for the bis(ethylsulfonyl)methane, and diisopropylamine is substituted for the piperidine. The product obtained is 2-butylsulfonylbenzofuran.

Example 4

A suitable reaction vessel is charged with 3.8 grams (0.02 mol) of 3,5-dichlorosalicylaldehyde, 4.0 grams (0.02 mol) of bis(ethylsulfonyl)methane and 50 ml. of toluene. There is then added 2.1 ml. of piperidine, and the reaction mixture is heated at reflux temperature for about 18 hours. The water which forms during the reaction is collected in a Dean-Stark trap. The resulting solution is freed of solvent at reduced pressure, and the residue is dissolved in isopropanol and treated with glacial acetic acid. The solution is cooled, and the crystalline material which forms is recrystallized from isopropanol. There is obtained 5,7-dichloro-2-ethylsulfonylbenzofuran as white needles, M.P. 141–142° C.

Example 5

Following the procedural details set forth in Example 4, 3.1 ml. of triethylamine is substituted for the piperidine. There is again obtained 5,7-dichloro-2-ethylsulfonylbenzofuran.

Example 6

Following the procedural details set forth in Example 4, 5-chlorosalicylaldehyde is substituted for the 3,5-dichlorosalicylaldehyde. The product obtained is 5-chloro-2-ethylsulfonylbenzofuran as white prisms, M.P. 122.5–123.5° C.

Example 7

Following the procedural details set forth in Example 4, 3-trifluoromethylsalicylaldehyde is substituted for the 3,5-dichlorosalicylaldehyde. The product obtained is 2-ethylsulfony-7-trifluoromethylbenzofuran.

Example 8

Following the procedural details set forth in Example 4, 5-bromosalicylaldehyde is substituted for the 3,5-dichlorosalicylaldehyde. The heating at reflux temperature is carried out for about 14.5 hours. The product obtained is 5-bromo-2-ethylsulfonylbenzofuran as white prisms, M.P. 113–114° C.

Example 9

Following the procedural details set forth in Example 8, 3,4-dibromosalicylaldehyde and bis(hexylsulfonyl)methane are employed as the reactants. The product obtained is 6,7-dibromo-2-hexylsulfonylbenzofuran.

Example 10

A suitable reaction vessel is charged with 4.2 grams (0.025 mol) of 5-nitrosalicylaldehyde, 5.0 grams (0.025 mol) of bis(ethylsulfonyl)methane and 50 ml. of toluene. There is then added 2.8 ml. (0.028 mol) of piperidine, and the reaction mixture is heated at reflux temperature for about 16.5 hours. The water which forms during the reaction is collected in a Dean-Stark trap. The resulting solution is freed of solvent at reduced pressure. The residue is dissolved in isopropanol and treated with glacial acetic acid. The solution is allowed to crystallize, after which it is filtered. The residue is then recrystallized from isopropanol to yield 2-ethylsulfonyl-5-nitrobenzofuran as tan granules, M.P. 181-182° C.

Example 11

Following the procedural details set forth in Example 10, 3,4,5-trichlorosalicylaldehyde is substituted for the 5-nitrosalicylaldehyde, and benene is substituted for the toluene. The product obtained is 2-ethylsulfonyl-5,6,7-trichlorobenzofuran.

Example 12

Following the procedural details set forth in Example 10, bis(propylsulfonyl)methane is substituted for the bis(ethylsulfonyl)methane. There is obtained 5-nitro-2-propylsulfonylbenzofuran.

Example 13

Following the procedural details set forth in Example 10, 3-nitrosalicylaldehyde is substituted for the 5-nitrosalicylaldehyde, and the heating at reflux temperature is carried out for about 14 hours. The product obtained is 2-ethylsulfonyl-7-nitrobenzofuran as white needles, M.P. 187-188° C.

As noted above, the 2-alkylsulfonylbenzofurans of this invention have been found to be useful in the control of bacterial and fungal organisms. For example, in representative tests, the compounds of Examples 1 and 4 controlled the growth of *Staphylococcus aureus*, *Aspergillus niger* and *Salmonella typhosa* at dilutions in excess of one part per one thousand. Similar results are obtained with other and different compounds of the invention.

While the invention has been described herein with regard to certain specific embodiments, it is not so limited. It is to be understood that variations and modifications thereof may be made by those skilled in the art without departing from the spirit and scope of the invention.

The embodiments of the invention in which an exclusive property or privilege is claimed are defined as follows:

1. A compound of the formula

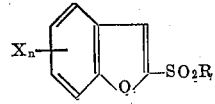

wherein R represents lower alkyl, $n$ is an integer from zero to three, and X is selected from the group consisting of chlorine, bromine, nitro and trifluoromethyl.

2. 2-lower alkylsulfonylbenzofuran.

3. x-Nitro 2-lower alkylsulfonylbenzofuran wherein $x$ represents any one of the 4 through 7 positions on the benzofuran nucleus.

4. x-Bromo 2-lower alkylsulfonylbenzofuran wherein $x$ represents any one of the 4 through 7 positions on the benzofuran nucleus.

5. x-Chloro 2-lower alkylsulfonylbenzofuran wherein $x$ represents any one of the 4 through 7 positions on the benzofuran nucleus.

6. x,x'-Dichloro 2-lower alkylsulfonylbenzofuran wherein $x$ and $x'$ each represent any one of the 4 through 7 positions on the benzofuran nucleus.

7. x-Trifluoromethyl 2-lower alkylsulfonylbenzofuran wherein $x$ represents any one of the 4 through 7 positions on the benzofuran nucleus.

8. A process for preparing a compound of the formula

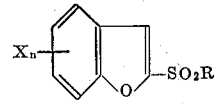

wherein R represents lower alkyl, $n$ is an integer from zero to three, and X is selected from the group consisting of chlorine, bromine, nitro and trifluoromethyl, which process comprises heating bis(lower alkylsulfonyl)methane in an aldehyde of the formula

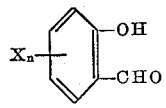

wherein X and $n$ have the same meaning as above, said heating being carried out in the presence of an excess of an organic base selected from the group consisting of secondary and tertiary amines having an ionization constant of at least about $10^{-5}$.

9. A process as defined in claim 8 wherein said heating is at about the reflux temperature of the system.

10. A process as defined in claim 8 wherein said heating is carried out in the presence of an inert organic solvent.

11. A process as defined in claim 10 wherein said solvent is selected from the group consisting of benzene, toluene, xylene, chlorobenzene and alkane having a boiling point of at least about 100° C.

12. A process as defined in claim 10 wherein said organic base is tertiary lower alkylamine and said solvent is toluene.

13. A process as defined in claim 10 wherein said organic base is piperidine and said solvent is toluene.

14. A process as defined in claim 8 wherein the excess of said organic base is a molar excess of from about 5% to about 50% relative to the molar amount of either of the reactants.

No references cited.

HENRY R. JILES, *Acting Primary Examiner*.
JAMES H. TURNIPSEED, *Assistant Examiner*.